April 22, 1952     L. S. HUFFMAN ET AL     2,594,172

MINNOW BUCKET

Filed Oct. 28, 1948

Inventors
Lloyd S. Huffman
Arthur B. Justin

By *Clarence A. O'Brien and Harvey B. Jacobson*
Attorneys

Patented Apr. 22, 1952

2,594,172

UNITED STATES PATENT OFFICE 2,594,172

MINNOW BUCKET

Lloyd S. Huffman and Arthur B. Justin, Vernon, Tex., assignors, by direct and mesne assignments, of one-fourth to D. Jones, Vernon, Tex., and three-fourths to said Huffman Application October 28, 1948, Serial No. 57,062

1 Claim. (Cl. 43—56)

This invention relates to new and useful improvements and structural refinements in minnow buckets, and the principal object of the invention is to considerably prolong the life and consequently the usefulness of minnows and other bait placed in the bucket while the latter is being transported from one location to another.

This object is achieved by the provision of means for aerating the water in the bucket, so as to provide the bait therein with an adequate supply of oxygen.

In particular, the invention concerns itself with minnow buckets wherein the water aeration operating is effected by periodically raising the bait receptacle above the water in the bucket and trapping a quantity of air under the receptacle, so that this trapped air may subsequently be slowly discharged into the water for the purpose of aerating the same.

An important feature of the invention, therefore, resides in the provision of means for substantially enlarging the air pocket or chamber, so that a comparatively greater volume of air may be trapped therein and slowly discharged into the water, so that the air trapping operation does not need to be performed at too frequent intervals.

Some of the advantages of the invention lie in its simplicity of construction, convenience and efficiency in use, and in its adaptability to economical manufacture.

With the above more important objects and features in view and such other objects and features as may become apparent as the specification proceeds, the invention consists essentially of the arrangement and construction of parts as illustrated in the accompanying drawings, in which.

Like characters of reference are employed to designate like parts in the specification and throughout the several views.

Figure 1:
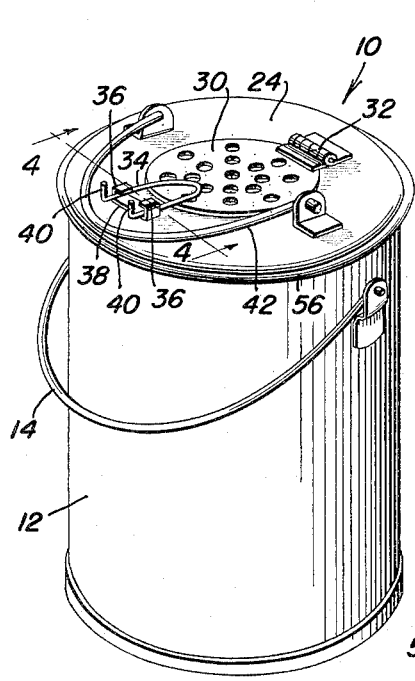
Figure 1 is a perspective view of the invention.
Figure 2:
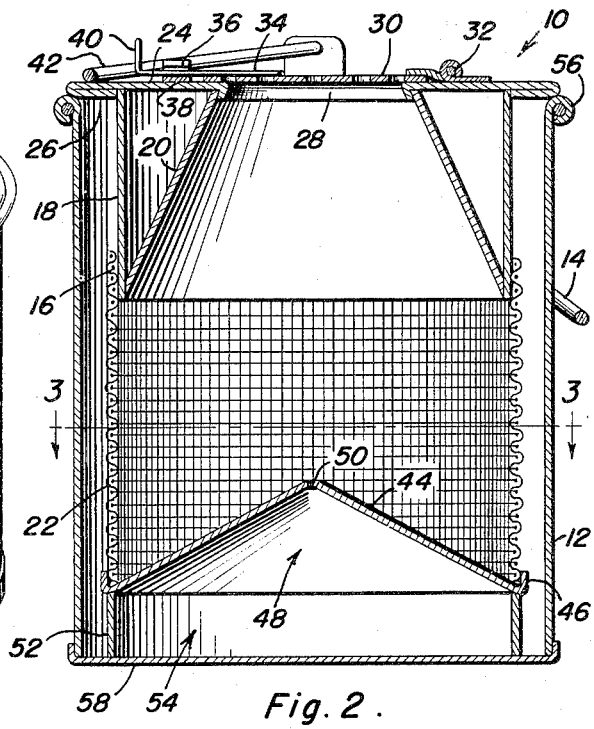
Figure 2 is a vertical cross-sectional view thereof, the same being taken substantially in the plane of the line 2—2 in Figure 3.
Figure 4:
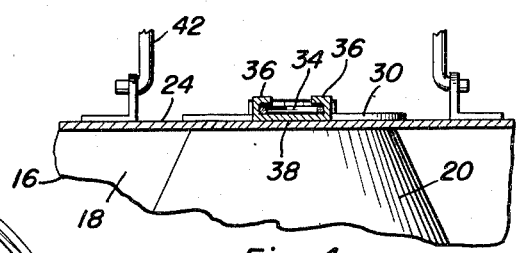
Figure 4 is a fragmentary cross-sectional view, taken substantially in the plane of the line 4—4 in Figure 1.
Figure 3:
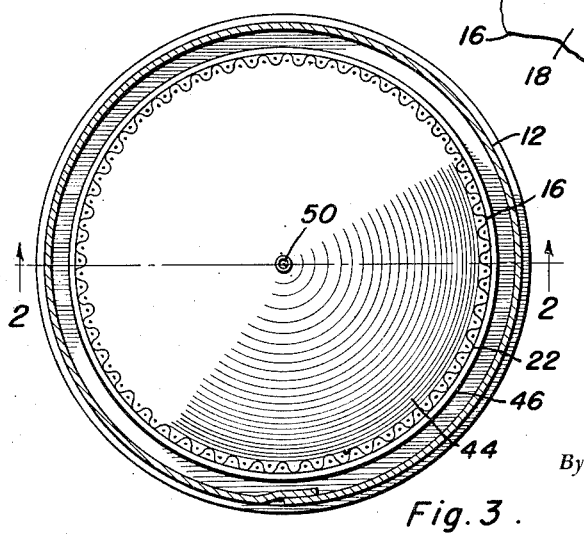
Figure 3 is a cross-sectional view, taken substantially in the plane of the line 3—3 in Figure 2.

Referring now to the accompanying drawings in detail, the invention consists of a minnow bucket designated generally by the reference character 10, the same embodying in its construction a water container 12 provided with a suitable bail 14 and adapted to removably receive therein a minnow receptacle 16 as is best shown in Figure 2.

The receptacle 16 includes in its construction an imperforate upper end portion 18 containing an inverted frusto-conical neck 20, while a foraminous lower portion 22 is suitably secured to the upper portion 18, the lower portion 22 preferably being formed from screen-like material, or the like. The top of the receptacle 16 is constituted by a circular plate 24 which has its marginal edge doubled under itself as at 26 (see Figure 2) and secured to the upper portion 18, while the center of the plate 24 is open and is formed with a downturned flange 28 which, in turn, is suitably secured to the minor upper end of the neck 20, substantially as shown.

A perforated cover 30 is hinged as at 32 to the top 24 and may be swung so as to close the opening in the upper portion of the neck 20, and means are provided for locking the cover in its closed position. These means simply assume the form of a resilient wire rod 34 having a substantially U-shaped configuration, the bight portion of this rod being rigidly secured to the cover 30, while the side portions or arms thereof are insertable between and releasably engageable with a pair of angulated, opposed detents 36 provided at the end portions of a strap 38 which, in turn, is secured to the top 24. The end portions of the rod 34 are upwardly angulated so as to form a pair of coacting finger-pieces 40, whereby the locking means may be conveniently and expeditiously operated during the opening and closing of the cover 30.

A suitable bail 42 may be provided on the top 24 of the bait receptacle 16, whereby the latter may be conveniently lifted out of the container 12.

The essence of novelty of the invention resides in the provision of a substantially conical bottom 44 which is formed with an upturned marginal flange 46 so that it may be suitably secured to the lower edge of the receptacle portion 22, this bottom defining under itself what may be referred to as a reentrant air pocket 48. It is to be noted that the bottom 44 is provided at the apex thereof with a small opening 50 through which air trapped in the pocket may escape into the water in the receptacle 16 and container 12.

In order that the air "capacity" of the pocket 48 may be substantially enlarged, a marginal flange 52 is secured to the outer edge portion of the bottom 44 as shown in Figure 2, this flange defining an enclosure 54 which, in effect, constitutes a continuation of the pocket 48. It is to be noted that when the receptacle 16 is fully lowered into the container 12, the doubled edge 26 of the receptacle top 24 rests upon a beaded edge 56 of the container 12, while the lower edge of the flange 52 engages the bottom 58 of the container, as shown in Figure 2.

When the invention is placed in use, the container 12 is filled with water and after placing the bait in the receptacle 16 upon opening the cover 30, the receptacle 16 is placed in the container in such manner that a volume of air is trapped in the enclosure 54 and pocket 48 while the flange 52 comes in contact with the water level in the container.

This trapped air will slowly escape through the aperture 50 into the water in the container and receptacle, while the receptacle 16 will slowly descend into the water in the container under the influence of gravity. However, the air escaping through the aperture 50 will efficiently aerate the water in the container, thus supplying the necessary oxygen for extended preservation of the life of the bait.

When the doubled edge portion 26 of the cover 24 comes in contact with the beaded edge 56 of the container, this will serve as an indication to the fisherman that the aerating operation has ceased, whereupon the bait receptacle may again be withdrawn from the container for the purpose of trapping additional air in the pocket 48 and enclosure 54, so that the aerating operation may be repeated.

It is believed that the advantages and use of the invention will be clearly understood from the foregoing disclosure. Accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

A minnow bucket, comprising a water container, a minnow receptacle removably receivable in said container, said receptacle including a foraminous side wall and an inverted conical bottom defining a re-entrant air pocket, and an annular flange provided at the lower edge of said receptacle and extending below said bottom, said flange defining an enclosure constituting a continuation of said pocket, said bottom being formed at the apex thereof with an opening whereby air trapped in said enclosure and pocket may escape into said receptacle and aerate water therein upon lowering of said receptacle into said container, said conical bottom having an upturned peripheral rim formed integrally therewith and forming an annular V-shaped notch with said conical bottom, and said foraminous side wall having the lowered edge thereof disposed in said notch and secured to said peripheral rim.

LLOYD S. HUFFMAN.
ARTHUR B. JUSTIN.

REFERENCES CITED

The following references are of record in the file of this patent:

UNITED STATES PATENTS

| Number | Name | Date |
| --- | --- | --- |
| 457,741 | Kimball | Aug. 11, 1891 |
| 1,451,925 | Ruff | Aug. 17, 1923 |
| 2,020,536 | Cox | Nov. 12, 1935 |
| 2,259,814 | Green et al. | Oct. 21, 1941 |
| 2,272,561 | Hubbell | Feb. 10, 1942 |